United States Patent
Watfa et al.

(10) Patent No.: US 12,556,938 B2
(45) Date of Patent: Feb. 17, 2026

(54) METHOD AND APPARATUS FOR PDU SESSION TRANSFER ACROSS DIFFERENT ACCESS TYPES

(71) Applicant: Samsung Electronics Co., Ltd., Suwon-si (KR)

(72) Inventors: Mahmoud Watfa, Staines (GB); Anikethan Ramakrishna Vijaya Kumar, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 17/927,227

(22) PCT Filed: May 21, 2021

(86) PCT No.: PCT/KR2021/006313
§ 371 (c)(1),
(2) Date: Nov. 22, 2022

(87) PCT Pub. No.: WO2021/241940
PCT Pub. Date: Dec. 2, 2021

(65) Prior Publication Data
US 2023/0292148 A1    Sep. 14, 2023

(30) Foreign Application Priority Data

May 23, 2020  (IN) ............................. 202031021750
May 18, 2021  (GB) ..................................... 2107087

(51) Int. Cl.
*H04W 24/02*    (2009.01)
*H04W 76/10*    (2018.01)
*H04W 88/06*    (2009.01)

(52) U.S. Cl.
CPC ........... *H04W 24/02* (2013.01); *H04W 76/10* (2018.02); *H04W 88/06* (2013.01)

(58) Field of Classification Search
CPC ..... H04W 24/02; H04W 76/10; H04W 88/06; H04W 76/22; H04W 8/02; H04W 4/70; H04W 80/10; G16Y 30/00
See application file for complete search history.

(56) References Cited

U.S. PATENT DOCUMENTS

2019/0037441 A1    1/2019  Liu et al.
2020/0305022 A1*   9/2020  Ianev ................... H04W 48/06
(Continued)

FOREIGN PATENT DOCUMENTS

GB          2601020 A       5/2022
WO     2017/170122 A1      10/2017
(Continued)

OTHER PUBLICATIONS

3rd Generation Partnership Project; Technical Specification Group Core Network and Terminals; Non-Access-Stratum (NAS) protocol for 5G System (5GS); Stage 3 (Release 16), 3GPP Standard; Technical Specification; 3GPP TS 24.501, 3rd Generation Partnership Project (3GPP), Mobile Competence Centre; 650, Route Des Lucioles; F-06921 Sophia-Antipolis Cedex; France vol. CT WG1, No. V16.4.0, Mar. 27, 2020 , pp. 1-666, XP051861107.
(Continued)

*Primary Examiner* — Charles C Jiang
*Assistant Examiner* — Rachel Elizabeth Marks
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health (Continued)

care, digital education, smart retail, security and safety services. Disclosed is a method of determining, in a User Equipment, if a PDU session between the UE and a network, can be transferred between 3GPP and non-3GPP access, when the UE is using a Cellular Internet of Things, CIoT, optimisation, wherein the determination is performed on the basis of a Control Plane, CP, only indication and if the determination is positive, then the PDU session is not transferred.

10 Claims, 2 Drawing Sheets

(56) References Cited

U.S. PATENT DOCUMENTS

| | | | |
|---|---|---|---|
| 2020/0323020 A1* | 10/2020 | Liu | H04W 80/10 |
| 2021/0136843 A1* | 5/2021 | Kawasaki | H04W 28/24 |

FOREIGN PATENT DOCUMENTS

| | | | | |
|---|---|---|---|---|
| WO | 2017/172912 A1 | 10/2017 | | |
| WO | 2019/198721 A1 | 10/2019 | | |
| WO | WO-2021235878 A1 * | 11/2021 | | H04W 48/00 |

OTHER PUBLICATIONS

XP051891222: Pdu session transfer between 3GPP and non-3GPP when UP CIoT optimization is being used. 3GPP Draft; C1-203673. May 26, 2020 (Samsung) CT WGI. Electronic meeting, May 26, 2020.

Partial Supplementary European Search Report dated Sep. 25, 2023, issued in European Patent Application No. 21813246.2.

Great Britain Search Report dated Jan. 17, 2023, issued in GB Patent Application No. GB2107087.5.

Extended European Search Report dated Feb. 9, 2024, issued in International Patent Application No. 21813246.2-1216.

ZTE et al.: CIoT user or small data container in CPSR message not forwarded, 3GPP Draft; C1-202779, 3rd Generation Partnership Project (3GPP), vol. CT WG1, No. Electronic meeting; XP052321810, Apr. 23, 2020.

Huawei et al., 'Correction of NEF-based NIDD procedures', S2-2003467, 3GPP TSG-WG SA2 Meeting #138E e-meeting, Elbonia, Apr. 24, 2020.

Samsung, 'Bridge Delay Clarification', S2-2003236, 3GPP TSG-WG SA2 Meeting #138E, Elbonia, Apr. 24, 2020.

Qualcomm Incorporated, 'Ethernet header compression for CP CIoT—5GSM aspects', C1-202426, 3GPP TSG-CT WG1 Meeting #123-e, Electronic meeting, Apr. 9, 2020.

3GPP; TSG CNT; Non-Access-Stratum (NAS) protocol for 5G System (5GS); Stage 3 (Release 16); 3GPP TS 24.501 V16.4.1, Apr. 1, 2020.

3GPP; TSG SSA; Procedures for the 5G System (5GS); Stage 2 (Release 16); 3GPP TS 23.502 V16.4.0, Mar. 27, 2020.

3GPP; TSG CNT; Non-Access-Stratum (NAS) protocol for Evolved Packet System (EPS); Stage 3 (Release 16); 3GPP TS 24.301 V16.4.0, Mar. 27, 2020.

3GPP; TSG SSA; System architecture for the 5G System (5GS); Stage 2 (Release 16); 3GPP TS 23.501 V16.4.0, Mar. 27, 2020.

Great Britain Search Report dated Feb. 17, 2022, issued in a counterpart GB Application No. GB2107087.5.

Great Britain Exam Report dated Oct. 20, 2022, issued in a counterpart GB Application No. GB2107087.5.

* cited by examiner

[Fig. 1]
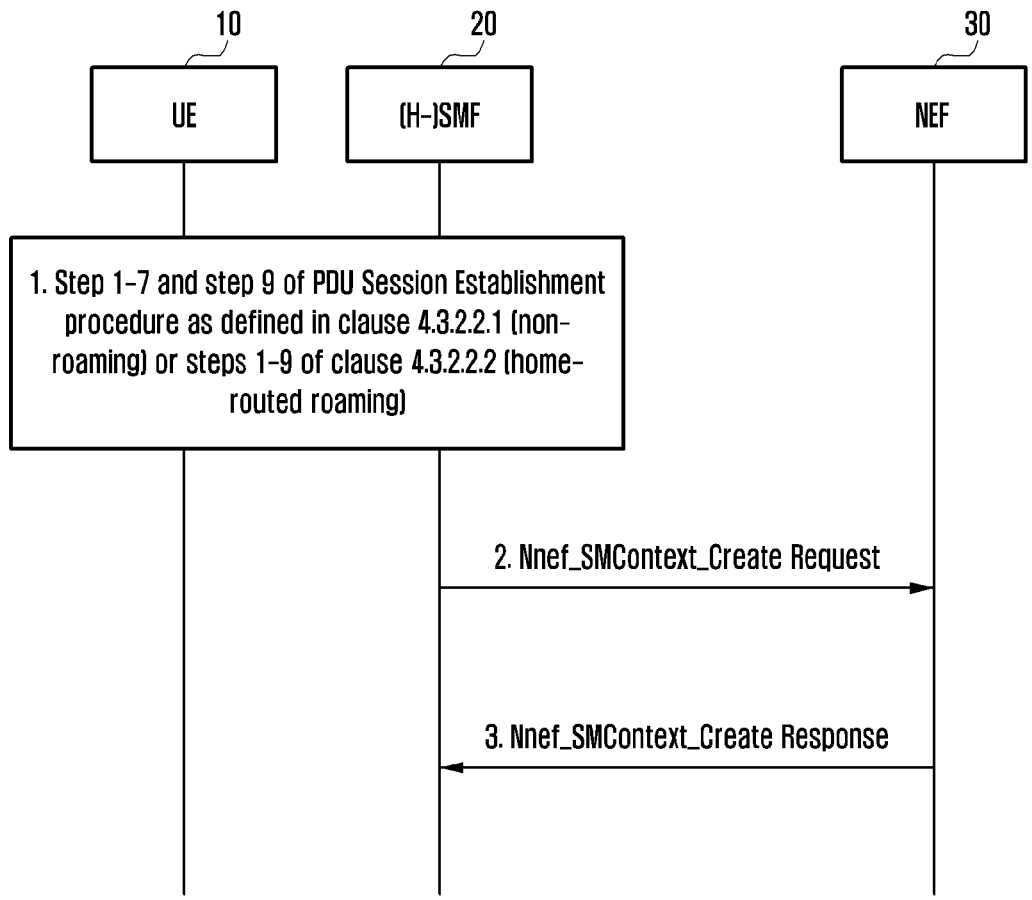
[Fig. 2]
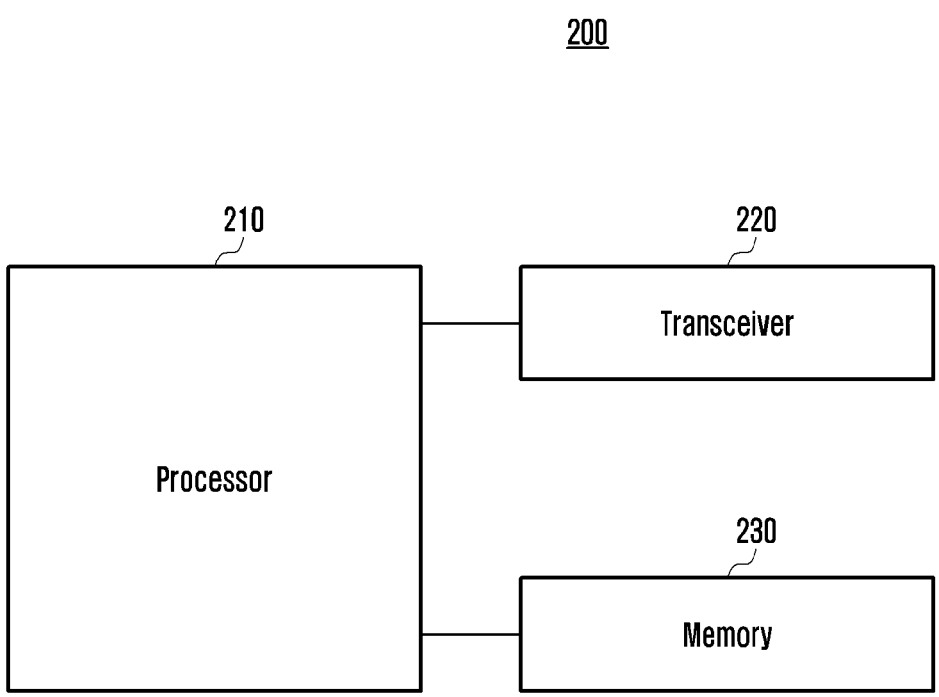

[Fig. 3]
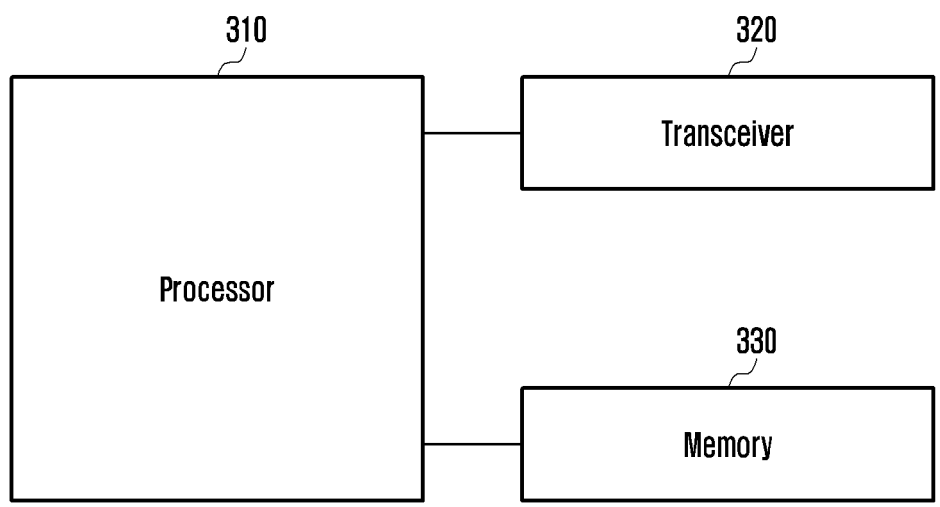

METHOD AND APPARATUS FOR PDU SESSION TRANSFER ACROSS DIFFERENT ACCESS TYPES

TECHNICAL FIELD

Embodiments of the present invention relate to methods and apparatus for Protocol Data Unit (PDU) session transfer across different access types, particularly in relation to Cellular Internet of Things (CIoT) optimizations.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

An aspect of the present invention provides method and apparatus for Protocol Data Unit (PDU) session transfer across different access types, particularly in relation to Cellular Internet of Things (CIoT) optimizations.

Solution to Problem

Embodiments of the present invention provide methods and apparatus for Protocol Data Unit (PDU) session transfer across different access types, particularly in relation to Cellular Internet of Things (CIoT) optimizations.

In order to achieve the above objective, the technical solution of the present disclosure is as follows.

In one embodiment, a method performed by a user equipment (UE) in a wireless communication system, the method comprising: determining, if a protocol data unit (PDU) session between the UE and a network, can be transferred between 3rd generation partnership project (3GPP) and non-3GPP access, when the UE is using a cellular internet of things (CIoT) optimization, wherein the determination is performed on the basis of a control plane (CP), only indication and if the determination is positive, then the PDU session is not transferred.

In another embodiment, a method performed by a network in a wireless communication system, the method comprising: determining, if a protocol data unit (PDU) session between a user equipment (UE) and the network can be transferred between 3rd generation partnership project (3GPP) and non-3GPP access, when the UE is using a cellular internet of things (CIoT), optimization, wherein the determination is performed on the basis of a control plane (CP), only indication and if the determination is positive, then the PDU session is not transferred.

In another embodiment, a method performed by a network in a wireless communication system, the method comprising: determining, if at least one protocol data unit (PDU) session can be transferred from a non-3rd generation partnership project (non-3GPP) access to 3GPP access, whereby if the at least one PDU session, established over 3GPP access, has been established for control plane-only use, then it is determined that the at least one PDU session is not transferred.

In another embodiment, a method performed by a user equipment (UE) in a wireless communication system, the method comprising: determining, using user plane cellular internet of thing (CIoT) fifth generation system (5GS) optimization, if a transfer of at least one protocol data unit (PDU) session from non-3rd generation partnership project (non-3GPP) access to 3GPP access can be requested or performed, whereby if the UE has User Plane resources established on the 3GPP access for a number of PDU sessions that equals a maximum number of data radio bearers (DRBs) supported by the UE, then it is determined that the UE does not request or perform the transfer of the at least one PDU session.

In another embodiment, a method performed by a network in a wireless communication system, the method comprising: determining, whether a request, from a user equipment (UE) operating in NB-N1 mode, which is using user plane cellular internet of thing (CIoT) fifth generation system (5GS) optimization, can be transferred from non-3rd generation partnership project (non-3GPP) access to 3GPP access, where a request type is set to "existing protocol data unit (PDU) session", whereby if the UE has user plane resources for a number of PDU sessions that equals a maximum number of data radio bearers (DRBs) that the UE supports, then it is determined that the session is not transferred.

In another embodiment, a method performed by a network in a wireless communication system, the method comprising: determining, whether user plane resources for a user equipment (UE) in NB-N1 mode can be provided or established, whereby if the UE has user plane resources established for a number of protocol data unit (PDU) sessions equal to a maximum number of data radio bearers (DRBs) that the UE supports, then it is determined that the user plane resources are not provided or established.

In another embodiment, a method performed by a network in a wireless communication system, the method comprising: determining, whether a request, from a user equipment (UE) operating in NB-N1 mode, which is using user plane cellular internet of thing (CIoT) fifth generation system (5GS) optimization, can be transferred from non-3rd generation partnership project (non-3GPP) access to 3GPP access, where a request type is set to "existing protocol data unit (PDU) session", whereby if the UE has user plane resources for a number of PDU sessions that equals a maximum number of data radio bearers (DRBs) that the UE supports, then it is determined that the session is not transferred.

In another embodiment, a method performed by a network in a wireless communication system, the method comprising: determining, whether user plane resources for a user equipment (UE) in NB-N1 mode can be provided or established, whereby if the UE has user plane resources established for a number of protocol data unit (PDU) sessions equal to a maximum number of data radio bearers (DRBs) that the UE supports, then it is determined that the user plane resources are not provided or established.

In another embodiment, a user equipment (UE) in a wireless communication system, the UE comprising: a transceiver; and a controller configured to: determine, if a protocol data unit (PDU) session between the UE and a network, can be transferred between 3rd generation partnership project (3GPP) and non-3GPP access, when the UE is using a cellular internet of things (CIoT) optimization, wherein the determination is performed on the basis of a control plane (CP), only indication and if the determination is positive, then the PDU session is not transferred.

In another embodiment, a network in a wireless communication system, the network comprising: a transceiver; and a controller configured to: determine, if a protocol data unit (PDU) session between a user equipment (UE) and the network can be transferred between 3rd generation partnership project (3GPP) and non-3GPP access, when the UE is using a cellular internet of things (CIoT), optimization, wherein the determination is performed on the basis of a control plane (CP), only indication and if the determination is positive, then the PDU session is not transferred Advantageous Effects of Invention Accordingly present invention, a method and apparatus for Protocol Data Unit (PDU) session transfer across different access types, particularly in relation to Cellular Internet of Things (CIoT) optimizations.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 shows signalling according to the prior art.

FIG. 2 illustrates a block diagram of an entity according to embodiments of the present disclosure.

FIG. 3 illustrates a user equipment (UE) according to embodiments of the present disclosure.

MODE FOR THE INVENTION

There are primarily two main types of CIoT optimizations referred to as: user plane (UP) CIoT optimization and control plane (CP) CIoT optimization. UP CIoT optimization refers to optimizations that relate to the use of the user plane resources. Whereas CP CIoT optimization refers to optimizations that relate to the efficient transfer of data over the control plane. Note that "data" may also refer to SMS and location service messages, etc.

The Non-access stratum (NAS) specification TS 24.501 (for N1 mode) provides a description of these optimizations and specifically have some sections that specify the UE and network behaviour when CP CIoT optimization is used. For example, sections 5.6.1.2.2 and 5.6.1.4.2 are particular to the case when CP CIoT optimization is used.

One of the main aspects of CP CIoT optimization is that the UE can send data from idle mode using the Control Plane Service Request (CPSR) message that has been defined in the aforementioned NAS specification.

Usually, the UE uses one of these optimizations at a time although it is possible that both are used simultaneously, as will be explained later. When the UE uses CP CIoT optimization, the UE's PDU sessions will be used to transfer data over the control plane i.e. over NAS signalling messages. However, a PDU session that is used for CP CIoT optimization can be a control plane only session, if the PDU Session Establishment Accept message includes the Control plane only indication Information Element (IE), or the session can be used for CP CIoT optimization and can be switched to a user plane session. Note that the latter is not a permanent switch to a user plane session but, rather, the UE can request the establishment of the user plane resources and use these resources for the transfer of data over the user plane. The UE may request the switch of the session to user plane based on e.g. the volume of data that needs to be sent or based on other conditions that are not specified. However, it is important to note that a PDU session for CP CIoT optimization may be a session for control plane data only or may allow the UE to request the establishment of user plane resources for the transfer of data over the user plane while still considering that the session is for CP CIoT optimization.

When a PDU session gets switched to user plane (i.e. when the user plane resources gets established for such a PDU session), if the UE also supports UP CIoT optimization, then the UE can apply UP CIoT optimization to this session for which user plane has been established. Note that after the release of the user plane resources, the UE continues to use the session as one for CP CIoT optimization unless the UE requests the establishment of user plane resources again. Note that although the user plane resources may be established for a PDU session for CP CIoT optimization, the UE maintains the use of the CPSR message when it needs to initiate the service request procedure for the corresponding PDU session.

For control plane CIoT 5GS optimization, a PDU session that is established to be using control plane only i.e. such a session will never be switched to user-plane and will be anchored in the Network Exposure Function (NEF). Such a PDU session has a PDU Session type of "Unstructured". The overall procedure to establish a PDU session that is anchored in the NEF is shown in FIG. 1, which is taken from section 4.25.2 of TS 23.502. This shows the message exchanges, labelled 1-3, between network entities User Equipment (UE) 10, Session Management Functions (SMF) 20 and NEF 30. HSMF refers to the SMF in the home network.

When the UE performs the PDU Session establishment with PDU Session type of "Unstructured", and the subscription information corresponding to the UE requested (Data Network Name) DNN includes the "NEF Identity for NIDD" (NEF ID), then the SMF initiates a SMF-NEF Connection establishment procedure towards the NEF corresponding to the "NEF ID" for that DNN/S-NSSAI Combination. Details of the message exchanges 1-3 follow:

1:
Steps 1-7 and step 9 of clause 4.3.2.2.1 for UE-requested PDU Session Establishment Procedure for non-roaming scenarios or steps 1-9 of clause 4.3.2.2.2 for UE-requested PDU Session Establishment Procedure for home-routed roaming scenarios. The (H-)SMF receives the Session Management Subscription data for the corresponding SUPI, DNN and S-NSSAI that is associated with NEF Identity for NIDD and NIDD information such GPSI and AF ID.

2:
If the subscription information corresponding to DNN and S-NSSAI includes the "NEF Identity for NIDD" (NEF ID), the SMF shall create a PDU session towards the NEF. The SMF invokes Nnef_SMContext_Create Request (User Identity, PDU session ID, SMF ID, NIDD information, S-NSSAI, DNN) message towards the NEF. The UE capability to support Reliable Data Service (RDS) is included in the PCO in the PDU Session Establishment Request message.

If no AF has previously performed the NIDD Configuration procedure with the NEF for the User Identity received in step 2, then the NEF initiates the NIDD Configuration procedure (see clause 4.25.3) before step 3.

3:
The NEF creates an NEF PDU session Context and associates it with User Identity and PDU session ID. The NEF invokes Nnef_SMContext_Create Response (User Identity, PDU session ID, S-NSSAI, DNN) towards the SMF confirming establishment of the PDU session to the NEF for the UE. If NEF supports and allows use of RDS, it indicate that to SMF and the SMF includes it in the PCO. If NEF supports Extended Buffering, NEF includes Extended Buffering Support indication in the response and subscribes for mobility-related events with the Access and Mobility Management Function (AMF) to receive an indication when the UE becomes reachable."

In other PDU sessions, although used for control plane CIoT 5GS optimization, the AMF may decide to have such a session anchored at the UPF (also referred to as N6 PDU session) as described in the aforementioned NAS specification. The following is taken from that specification:

"If the UE and the network support both the control plane CIoT 5GS optimization and N3 data transfer, then when receiving the UE's request for a PDU session establishment, the AMF decides whether the PDU session should be NEF PDU session or N6 PDU session as specified in 3GPP TS 23.501 and then:

a) if NEF PDU session is to be established for unstructured data type, the AMF includes Control plane only indication for the requested PDU session to the SMF;

b) if N6 PDU session is to be established and the DNN or S-NSSAI of the newly requested N6 PDU session supports interworking with EPS as specified in TS 23.502:
1) if there are existing N6 PDU sessions supporting interworking with EPS for this UE that were established with the Control plane only indication, the AMF includes the Control plane only indication for the newly requested N6 PDU session to the SMF; or
2) if there are existing N6 PDU sessions supporting interworking with EPS for this UE that were established without the Control plane only indication, the AMF does not include the Control plane only indication for the newly requested N6 PDU session to the SMF;
3) if there is no existing N6 PDU session supporting interworking with EPS for this UE, the AMF determines whether to include the Control plane only indication for the newly requested N6 PDU session to the SMF based on local policies, the UE's preferred CIoT network behaviour and the supported CIoT network behaviour; and c) if N6 PDU session is to be established and the DNN or S-NSSAI of the N6 PDU session does not support interworking with EPS as specified in TS 23.502 [9], the AMF determines whether to include the Control plane only indication for the newly requested N6 PDU session to the SMF based on local policies, the UE's preferred CIoT network behaviour and the supported CIoT network behaviour."

CIoT 5GS optimizations (i.e. control plane CIoT 5GS optimization and user plane CIoT 5GS optimization) are not supported over non-3GPP access.

The 5GS supports the transfer of PDU sessions between 3GPP access and non-3GPP access when the UE is registered to the same PLMN (and AMF) over both access types. For example, the UE may have established a PDU session over the non-3GPP access. Later, the UE may no longer have coverage of the non-3GPP access and as such can request the transfer of the PDU session from non-3GPP access to the 3GPP access.

To do so, the UE initiates a PDU establishment procedure (i.e. sends the PDU Session Establishment Request message) and in the UL NAS TRANSPORT message (using the access over which the session is to be transferred) which is used to transfer the 5GSM NAS message the UE shall:
  Set the PDU session ID to the PDU session ID of the session being transferred
  Set the Request type Information Element (IE) is set to "existing PDU session"

Note that the example above is to transfer a session from non-3GPP access to 3GPP access but the same solution applies in the other direction i.e. to transfer a session from 3GPP access to the non-3GPP access.

The network may also initiate the transfer of a PDU session specifically from the non-3GPP access to the 3GPP access. This can occur when the UE is registered over both the 3GPP access and the non-3GPP access but the UE is not reachable via the non-3GPP access. As paging is not supported over the non-3GPP access, the network may then page the UE over the 3GPP access and set the access type to non-3GPP. The latter informs the UE that the paging is related to at least one PDU session that is established over the non-3GPP access for which the network may have signalling to send to the UE. Note that paging here also includes the Notification message that is sent by the AMF to the UE while the UE is in 5GMM-CONNECTED mode.

When a paging is received by the UE and the access type is set to non-3GPP, the UE initiates a service request procedure (i.e. sends the Service Request message) and shall include the Allowed PDU session status IE in the Service Request message. The IE contains a bitmap of the PDU session IDs that the UE uses (or sets) to indicate which PDU session can be transferred to the 3GPP access. The determination to transfer a session or not is based on UE local policies and is implementation dependent. The following text from section 5.6.1.2.1 in the aforementioned NAS specification describes the use of the Allowed PDU session status IE during the service request procedure:

"For case a) in subclause 5.6.1.1:
  a) if the paging request includes an indication for non-3GPP access type, the Allowed PDU session status IE shall be included in the SERVICE REQUEST message. If the UE has established the PDU session(s) associated with the S-NSSAI(s) which are included in the allowed NSSAI for 3GPP access, the UE shall indicate the PDU session(s) for which the UE allows the user-plane resources to be re-established over 3GPP access in the Allowed PDU session status IE. Otherwise, the UE shall not indicate any PDU session(s) in the Allowed PDU session status IE;
  b) if the UE has uplink user data pending to be sent over 3GPP access, the Uplink data status IE shall be included in the SERVICE REQUEST message to indicate the PDU session(s) for which the UE has pending user data to be sent; or
  c) otherwise, the Uplink data status IE shall not be included in the SERVICE REQUEST message.
For case b) in subclause 5.6.1.1:
  a) the Allowed PDU session status IE shall be included in the SERVICE REQUEST message. If the UE has the PDU session(s) associated with the S-NSSAI(s) which are included in the allowed NSSAI for 3GPP access, the UE shall indicate the PDU session(s) for which the UE allows the user-plane resources to be re-established over 3GPP access in the Allowed PDU session status IE. Otherwise, the UE shall not indicate any PDU session(s) in the Allowed PDU session status IE;
  b) if the UE has uplink user data pending to be sent over 3GPP access, the Uplink data status IE shall be included in the SERVICE REQUEST message to indicate the PDU session(s) for which the UE has pending user data to be sent;
  c) otherwise, the Uplink data status IE shall not be included in the SERVICE REQUEST message.

When the Allowed PDU session status IE is included in the SERVICE REQUEST message, the UE shall indicate that a PDU session is not allowed to be transferred to the 3GPP access if the 3GPP PS data off UE status is "activated" for the corresponding PDU session and the UE is not using the PDU session to send uplink IP packets for any of the 3GPP PS data off exempt services (see subclause 6.2.10)."

If the UE allows a PDU session to be transferred by means of the Allowed PDU session status IE, the UE sets the bit corresponding to the PDU session ID to '1' (see section 9.11.3.13 in the aforementioned NAS specification).

Narrow Band (NB)-IoT devices are restricted by the number of data radio bearers (DRBs) that they can support where the maximum is 2 DRBs at a time. In 5GS, unlike EPS, the UE can have selective user-plane activation of any of its PDU sessions that it has established. For example, if the UE has established 3 PDU sessions, it does not necessarily mean that the UE will have DRBs for all 3 PDU sessions. Based on the need to send data over a particular PDU session, the UE can request the establishment of UP resources for 1 of its PDU sessions only.

Note that UP resources constitute DRBs and other resources e.g. between the Radio Access Network (RAN) and the Core Network (CN) nodes such as the UPF (User Plane Function). Hence, UP resources are not necessarily limited to DRBs but can be used to refer to DRBs.

To select the establishment of UP resources for a specific PDU session, the UE uses the Uplink data status IE to indicate for which PDU session ID the resources being requested. The IE can be sent in the Control Plane Service Request (CPSR) message, Service Request (SR) message, or Registration Request message. The inclusion of the Uplink data status IE in the Registration Request message is based on specific conditions that are defined in the aforementioned NAS specification. However, in general, the CPSR or SR message is used for the purpose of requesting the establishment of UP resources for at least one PDU session.

In NB-IoT, there can be UP resources established for at most 2 PDU sessions at a given time since the UE is limited by the number of DRBs that it can support in this mode.

Due to the restrictions described above, the aforementioned NAS specification has defined certain restrictions on the UE that is using user-plane CIoT 5GS optimization. For example, the following restriction is introduced for the service request procedure:

"In NB-N1 mode, this procedure shall not be used to request the establishment of user-plane resources:
  a) for more than two PDU sessions if there is currently:
    1) no user-plane resources established for the UE;
    2) user-plane resources established for one PDU session; or
  b) for additional PDU sessions, if the UE already has user-plane resources established for two PDU sessions."

The following restriction (see bullet c below) is introduced for the PDU session establishment procedure:

"The UE shall not request a PDU session establishment:
  a) for an LADN when the UE is located outside the LADN service area;
  b) to transfer a PDU session from non-3GPP access to 3GPP access when the 3GPP
  PS data off UE status is "activated" and the UE is not using the PDU session to send uplink IP packets for any of the 3GPP PS data off exempt services (see subclause 6.2.10); or
  c) when the UE is in NB-N1 mode, the UE has indicated preference for user plane CIoT 5GS optimization, the network has accepted the use of user plane CIoT 5GS optimization for the UE, and the UE currently has user-plane resources established for two other PDU sessions."

Although these restrictions are put in place for the UE, the network will still perform a check to ensure that the restrictions are not ignored or erroneously disregarded. For example, during the PDU session establishment procedure, the AMF verifies if the UE already has UP resources established for at most 2 PDU sessions. If this is the case, then any new request to establish a PDU session from the UE will either be established as a PDU session for control plane CIoT optimization, or it will be rejected by the AMF. This is described below from the aforementioned NAS specification:

"Upon reception of a UL NAS TRANSPORT message, if the Payload container type IE is set to "N1 SM information", the Request type IE is set to "initial request", and
  a) the UE is in NB-N1 mode;
  b) the UE has indicated preference for user plane CIoT 5GS optimization;
  c) the network accepted the use of user plane CIoT 5GS optimization; and
  d) the AMF determines that there are user-plane resources established for two other PDU sessions for this UE (see 3GPP TS 23.501);
the AMF shall either:
  a) send back to the UE the message which was not forwarded as specified in in subclause 5.4.5.3.1 case h1); or
  b) proceed with the PDU session establishment and include the Control Plane CIoT 5GS Optimisation indication or Control Plane Only indicator to the SMF."

It should be noted again that these restrictions are only for NB-IoT devices i.e. UEs in NB-N1 mode in the case of 5GC.

It is not clear whether the UE or the network can transfer PDU sessions across 3GPP and non-3GPP accesses in general. Noting that control plane CIoT 5GS optimization is not supported over the non-3GPP access, any attempt to transfer a session by the UE may actually succeed and may then result in unknown behaviour i.e. it is not clear how the UE can actually use such a PDU session over the non-3GPP access.

For user-plane CIoT 5GS optimization, it is not clear if PDU sessions can always be transferred since in some cases the AMF indicates to the SMF that new PDU sessions should be control plane only as described above. For example, the aforementioned NAS specification states that: "if there are existing N6 PDU sessions supporting interworking with EPS for this UE that were established with the Control plane only indication, the AMF includes the Control plane only indication for the newly requested N6 PDU session to the SMF"

The above means that, if the UE already has one PDU session that is established with the Control plane only indication and if interworking with EPS is supported for the PDU session, then subsequent new PDU sessions to be established will also include the Control plane only indication. This means that a PDU session that is established over the non-3GPP session, which does not have this indication as the feature is not supported over non-3GPP, may not be subject to transfer over the 3GPP access. This is because the UE will then have a mix of PDU sessions i.e. some of which are for control plane only (i.e. those established as such over the 3GPP access) and at least one PDU session that is not for control plane only i.e. any session that gets transferred from the non-3GPP access.

Therefore, there is a need to clearly describe what is allowed and when it is allowed i.e. there may be some conditions under which transfer of PDU sessions across accesses may be allowed and other conditions under which the transfer is not allowed. These conditions are absent in the prior art and may lead to unpredictable UE and network behaviour. This is clearly undesirable.

It is an aim of embodiments of the present invention to address shortcomings in the prior, whether mentioned herein or not. In particular, it is an aim of embodiments of the present invention to provide a means whereby unpredictable UE or network behaviour is avoided.

According to the present invention there is provided an apparatus and method as set forth in the appended claims. Other features of the invention will be apparent from the dependent claims, and the description which follows.

According to a first aspect of the present invention, there is provided a method of determining, in a User Equipment, if a PDU session between the UE and a network, can be transferred between 3GPP and non-3GPP access, when the UE is using a Cellular Internet of Things, CIoT, optimisation, wherein the determination is performed on the basis of a Control Plane, CP, only indication and if the determination is positive, then the PDU session is not transferred.

According to a second aspect of the present invention, there is provided method of determining, in a network, if a PDU session between a UE and the network can be transferred between 3GPP and non-3GPP access, when the UE is using a Cellular Internet of Things, CIoT, optimisation, wherein the determination is performed on the basis of a Control Plane, CP, only indication and if the determination is positive, then the PDU session is not transferred.

In an embodiment, if the determination is that the PDU session cannot be transferred then an AMF of the network returns a 5GSM message to the UE.

According to a third aspect of the present invention, there is provided a method of determining, in a network, if at least one PDU session can be transferred from a non-3GPP access to 3GPP access, whereby if the at least one PDU session, established over 3GPP access, has been established for Control Plane-only use, then it is determined that the at least one PDU session is not transferred.

In an embodiment, the at least one PDU session comprises all established PDU sessions.

According to a fourth aspect of the present invention, there is provided a method of determining, in a UE, using user plane CIoT 5GS optimization, if a transfer of at least one PDU session from non-3GPP access to 3GPP access can be requested or performed, whereby if the UE has User Plane resources established on the 3GPP access for a number of PDU sessions that equals a maximum number of DRBs supported by the UE, then it is determined that the UE does not request or perform the transfer of the at least one PDU session.

In an embodiment, the UE is operating in NB-N1 mode.

According to a fifth aspect of the present invention, there is provided a method of determining, in a network, whether a request, from a UE operating in NB-N1 mode, which is using User Plane CIoT 5GS optimisation, can be transferred from non-3GPP access to 3GPP access, where a request type is set to "existing PDU session", whereby if the UE has User Plane resources for a number of PDU sessions that equals a maximum number of DRBs that the UE supports, then it is determined that the session is not transferred.

In an embodiment, if the determination is that the session is not transferred then an AMF in the network returns a 5GSM message to the UE.

According to a sixth aspect of the present invention, there is provided a method of determining, in a network, whether user plane resources for a UE in NB-N1 mode can be provided or established, whereby if the UE has User Plane resources established for a number of PDU sessions equal to a maximum number of DRBs that the UE supports, then it is determined that the User Plane resources are not provided or established.

In an embodiment, an AMF of the network notifies an SMF of the network that reactivation of user plane resources cannot be performed if the number of PDU sessions that currently has user-plane resources established is equal to the UE's maximum number of supported user-plane resources.

In an embodiment, an SMF in the network makes the request to an AMF in the network for the User Plane resources and the AMF performs the determination.

According to a seventh aspect of the present invention, there is provided apparatus arranged to perform the method of any preceding aspect.

In an embodiment, the apparatus comprises one or more of a User Equipment and a network component, such as AMF or SMF.

In the prior art, there are currently no descriptions, behaviors or rules that determine whether, and how, PDU session can be transferred between 3GPP and non-3GPP access when the UE is using CIoT 5GS optimizations. This can lead to inconsistent UE and network behaviour, where specific requests that are valid may end up failing, or where specific requests that are invalid may end up succeeding. Both of these situations may lead to service failure in the network and are undesirable. Embodiments of the present invention provide consistent UE and network behaviour by defining rules and checks that are enforced by both the UE and the network.

Embodiments of the present invention define clear rules and behaviour at the UE and network to ensure that the transfer of specific PDU sessions across 3GPP and non-3GPP are possible. Specific conditions should be verified by the UE and the network before requesting the transfer of a session when specific CIoT 5GS optimizations are being used. Specific conditions are needed to be verified in order to determine if sessions can be transferred between 3GPP and non-3GPP accesses when the UE uses control plane CIoT 5GS optimization or user plane CIoT 5GS optimization. Additionally, the AMF has to perform certain checks to determine if the UE has abided by the expected rules and if not then the AMF rejects the request to transfer a session from the UE Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which:

FIG. 1 shows signalling according to the prior art.

Embodiments of the present invention address the problem identified in the prior art by defining certain rules and behaviours. There are different means of addressing the overarching problem and these are set out in the following.

In a first embodiment, a default behaviour is as follows. When the UE is using control plane CIoT 5GS optimization, the UE should not transfer a session from the 3GPP access to the non-3GPP access and, optionally, the UE should not transfer a session from the 3GPP access to the non-3GPP access if the UE received the Control plane only indication IE in the PDU Session Establishment Accept message, where the 'Control plane only indication value' indicates "PDU session can be used for control plane CIoT 5GS optimization only".

The UE should not transfer a session from the 3GPP access to the non-3GPP access except if the PDU Session Establishment Accept message did not include the Control plane only indication IE.

The UE should not transfer a session from the non-3GPP access to the 3GPP access if the UE has at least one PDU session, or optionally all of the UE's PDU session, that is/are established over the 3GPP access have been established for control plane use only e.g. if the UE received the Control plane only indication IE in the PDU Session Establishment Accept message, where the 'Control plane only indication value' indicates "PDU session can be used for control plane CIoT 5GS optimization only" and, optionally, if the network has indicated support for interworking with EPS for these sessions by assigning a mapped EPS bearer ID. Note that the description herein would apply for a PDN connection that was established in S1 mode (i.e. EPS) where the session (or PDN connection) was determined to be for control plane only, and the session was then transferred to 5GS (i.e. to N1 mode). As such, the description above (and herein) would apply for any session that is associated with the control plane only indication regardless of where the session was first established and regardless of which NAS message contained the "Control plane only indication" e.g. in the Activate Default EPS Bearer Context Request message which is the session management message in EPS (S1 mode).

The UE can transfer a session from the non-3GPP access to the 3GPP access if the UE has at least one PDU session or, optionally, all of the UE's PDU sessions, that is/are established over the 3GPP access have been established not for control plane use only i.e. the Control plane only indication IE was not received in the PDU Session Establishment Accept message.

In the case when the UE is using user plane CIoT 5GS optimization, then:
 the UE should not transfer a session from the non-3GPP access to the 3GPP access;
 the UE should not transfer a session from 3GPP access to the non-3GPP access;
 the UE can transfer a session from the 3GPP access to the non-3GPP access. If this is achieved, then the UE considers the PDU session to be a regular PDU session i.e. one that does not use user plane CIoT 5GS optimization;
 the UE can transfer a session from the non-3GPP access to the 3GPP access.

In the latter case above, then one of the following can apply: if transferred to 3GPP access, then the UE considers the PDU session to be a regular PDU session i.e. one that does not use user plane CIoT 5GS optimization; or if transferred to 3GPP access, then the UE considers the PDU session to be a PDU session for user plane CIoT 5GS optimization.

When the UE is in NB-N1 mode over the 3GPP access, the UE shall not attempt to transfer a session from the non-3GPP access to the 3GPP access.

When the UE is in NB-N1 mode over the 3GPP access, the UE shall not request the transfer of the session from non-3GPP access to 3GPP access if the UE already has UP resources established for a number of PDU sessions that equals the maximum number of DRBs (Data Radio Bearers) that is supported by the UE (or the maximum number of user plane resources that is supported by the UE) over the 3GPP access. In this case (e.g. when the UE already has user plane resources for a number of PDU sessions such that this number equals the maximum number of DRBs that is supported by the UE), if the UE wants to transfer a PDU session from non-3GPP access to the 3GPP access when the UE is in NB-N1 mode, the UE should first release a PDU session over the 3GPP access. The UE can choose any PDU session to be released based on implementation. However the UE should not release a PDU session that is used for the transfer of exception data reporting or to send/transfer data related to an exceptional event.

Note that in relation to the above, where applicable, the UE receiving the Control plane only indication IE in the PDU Session Establishment Accept message optionally also means that the SMF had sent the Control plane only indication IE in the PDU Session Establishment Accept message. Alternatively, it can mean that the AMF had sent Control Plane CIoT 5GS Optimisation indication or the Control Plane Only indicator to the SMF, during the PDU session establishment procedure.

Note that the behaviours set out above can be used in any combination. It should also be noted that by "a PDU session that is used for control plane only" is synonymous to the PDU Session Establishment Accept message including the Control plane only indication IE.

Note also that the above listed options for the default behaviour can also be regarded as conditions that will be checked and enforced by the UE and/or the network (e.g. AMF) as will be described below. Therefore, the description set out above can also be considered to be valid for the AMF and, as such, the term "UE" can be interpreted to comprise "AMF" in the description above and herein.

It is also possible that the network pages the UE in the 3GPP access and sets the access type to non-3GPP i.e. the paging is related to one or more PDU session that is established on the non-3GPP access. Again, it should be noted that paging can mean the sending of the Notification message for a UE that is in 5GMM-CONNECTED mode over the 3GPP access, or it may mean paging the UE in idle mode using the RRC paging message with the access type set to non-3GPP access.

When the UE is paged over 3GPP access with the access type in the paging message (or Notification message) set to non-3GPP, the UE should take one or more of the actions set out below.

If control plane CIoT 5GS optimization is being used, then:
  The UE shall send the CPSR message and include the Allowed PDU session status IE but the UE will set the bits such that the UE indicates that no PDU session is allowed to be transferred to the 3GPP access, if the default behaviour is that the transfer of a session from non-3GPP to 3GPP is not allowed
  If the UE has at least one PDU session for which the Control plane only indication IE was received in the PDU Session Establishment Accept message, the UE shall send the CPSR message and include the Allowed PDU session status IE but the UE will set the bits such that the UE indicates that no PDU session is allowed to be transferred to the 3GPP access
  If the default behaviour allows a transfer, the UE may be allowed to transfer the session to the 3GPP access based on UE policy. The UE may consider the session to be one that is not subject to any CIoT 5GS optimization. Alternatively, if the UE supports user plane CIoT 5GS optimization, then the session can be used for user plane CIoT 5GS optimization. In the latter case, the AMF may, based on the UE's support of user plane CIoT 5GS optimization, inform the SMF and/or RAN to apply user plane CIoT 5GS optimization on this session
  If the default behaviour allows a transfer and if the UE is in NB-IoT, the UE can send the CPSR message with the Allowed PDU session status IE and indicate which PDU session the UE allows to be transferred to 3GPP (based on UE policies). In this case, the UE shall ensure that the contents of the CPSR message will not request the establishment of UP resources for a number of PDU sessions that exceeds the maximum number of DRBs that is supported by the UE. To do so, the UE considers the current number of PDU sessions that have UP resources and ensures that the additional request for UP resources will not result to a request for UP resources for a number of PDU sessions that exceeds the maximum number of DRBs that is supported by the UE. Hence, the UE should ensure this restriction is respected in the:
  Allowed PDU session status IE only if the Uplink data status IE is not sent in the CPSR message, or
  both the Allowed PDU session status IE and the Uplink data status IE if both are sent in the CPSR message
  If the UE wants to transfer a session (that is established over non-3GPP access) to 3GPP access and the UE already has UP resources established for a number of PDU sessions that equals the maximum number of DRBs that is supported by the UE on 3GPP access, the UE should take one of the following actions:
  The UE should first initiate a PDU session release procedure to release at least one PDU session that it has UP resources established over 3GPP access. Which PDU session that the UE chooses to release is implementation specific. However, the UE should not release a PDU session that is used for exception data reporting. After at least one PDU session is released, the UE can then respond to the paging (or Notification message) by sending the SR message and including the Allowed PDU session status IE to indicate which PDU session the UE needs to transfer from non-3GPP to 3GPP access. If the UE needs to transfer more than one PDU session to the 3GPP access, then the UE should release more than one (i.e. the maximum number of) PDU session for which UP resources are established over the 3GPP access, or
  The UE should locally release a PDU session over the 3GPP access. When the UE sends the SR message, the UE includes the PDU session status IE and indicates that the PDU session has been released. The UE also includes the Allowed PDU session status IE to indicate which PDU session(s) the UE wants to transfer to the 3GPP access Note that in some cases, the UE responds to paging using the Registration Request message. For this case, the procedure set out above would also apply when sending the Registration Request message.

If user plane CIoT 5GS optimization is being used, then:
  The UE sends the Service Request (SR) message and includes the Allowed PDU session status IE but the UE will set the bits such that the UE indicates that no PDU session is allowed to be transferred to the 3GPP access, if the default behaviour is that the transfer of a session from non-3GPP to 3GPP is not allowed.
  If the UE has at least one PDU session for which the Control plane only indication IE was received in the PDU Session Establishment Accept message, the UE shall send the CPSR message and include the Allowed PDU session status IE, but the UE will set the bits such that the UE indicates that no PDU session is allowed to be transferred to the 3GPP access.
  The UE may be allowed to transfer the session to 3GPP access based on UE policy. The UE may consider the session to be one that is not subject to any CIoT 5GS optimization. Alternatively, if the UE supports user plane CIoT 5GS optimization, then the session can be used for user plane CIoT 5GS optimization. In the latter case, the AMF may, based on the UE's support of user plane CIoT 5GS optimization, inform the SMF and/or RAN to apply user plane CIoT 5GS optimization on this session.

If the UE is in NB-IoT, the UE can send the SR message with the Allowed PDU session status IE and indicate which PDU session the UE allows to be transferred to 3GPP (e.g. based on UE policies). In this case, the UE shall ensure that the contents of the SR message will not request the establishment of UP resources for a number of PDU sessions that exceeds the number of DRBs that is supported by the UE. To do so, the UE considers the current number of PDU sessions that have UP resources and ensures that the additional request for UP resources will not result to a request for UP resources for a number of PDU sessions that exceeds the maximum number of DRBs that is supported by the UE. Hence, the UE should ensure this restriction is respected in the:

Allowed PDU session status IE only if the Uplink data status IE is not sent in the CPSR message, or both the Allowed PDU session status IE and the Uplink data status IE if both are sent in the CPSR message.

If the UE wants to transfer a session (that is established over the non-3GPP access) to the 3GPP access and the UE already has UP resources established for a number of PDU sessions that equals the maximum number of DRBs that is supported by the UE on the 3GPP access, the UE should take one of the following actions:

The UE should first initiate a PDU session release procedure to release at least one PDU session that has UP resources established over the 3GPP access. Which PDU session that the UE chooses to release is implementation specific. However, the UE should not release a PDU session that is used for exception data reporting. After at least one PDU session is released, the UE can then respond to the paging (or Notification message) by sending the SR message and including the Allowed PDU session status IE to indicate which PDU session the UE needs to transfer from non-3GPP to 3GPP access. If the UE needs to transfer more than one PDU session to the 3GPP access, then the UE should release more than one (i.e. the maximum number of) PDU session for which UP resources are established over the 3GPP access, or The UE should locally release a PDU session over the 3GPP access. When the UE sends the SR message, the UE includes the PDU session status IE and indicates that the PDU session has been released. The UE also includes the Allowed PDU session status IE to indicate which PDU session(s) the UE wants to transfer to the 3GPP access Note that in some cases, the UE responds to paging using the Registration Request message. For this case, the rules set out above would also apply when sending the Registration Request message by the UE.

The above procedure describes behaviour on the UE side with regard to the transfer of PDU sessions between 3GPP and non-3GPP access. However, it is also possible that a UE may erroneously take an action that is not desired and for which the network needs to check and apply any necessary corrective action(s).

The AMF should take any of the following actions, in any combinations, based on the default behaviour when a particular CIoT 5GS optimization is being used. Note that the actions below may apply to either control plane CIoT 5GS optimization, or user plane CIoT 5GS optimization, or both.

When the default behaviour is such that a session cannot be transferred, from non-3GPP access to 3GPP access (e.g. due to the UE having a control plane only session, or due to any of the default behaviours described above), then the AMF shall ensure that it does not send a NOTIFICATION message to the UE over 3GPP access, to reestablish the user-plane resources of PDU session(s) associated with non-3GPP access over 3GPP access or to deliver 5GSM downlink signalling messages associated with non-3GPP access over 3GPP access when the UE is in 5GMM-IDLE mode over non3GPP access and in 5GMM-CONNECTED mode over 3GPP access. In this case, the AMF shall reject any request from the SMF to deliver a 5GSM message to the UE or shall reject any request from the SMF to re-establish the user plane resources for the UE.

When the default behaviour is such that a session cannot be transferred, either from non-3GPP access to 3GPP access (e.g. due to the UE having a control plane only session, or due to any of the default behaviours described above), then:

Upon reception of a UL NAS TRANSPORT message, if the Payload container type IE is set to "N1 SM information", the Request type IE is set to "existing PDU session", when a condition is met where the condition is any of the default solutions that is set out earlier, the AMF shall not forward the 5GSM message to the SMF and shall send the 5GSM message (which was not forwarded to the SMF) back to the UE using the DL NAS TRANSPORT message. The AMF shall include any existing 5GMM cause such as #92"insufficient user-plane resources for the PDU session" or #90"payload was not forwarded", etc. Alternatively, a new 5GMM cause code can be defined and used to inform the UE that a particular PDU session cannot be transferred due to the use of specific CIoT 5GS optimizations over the desired target access.

Note that the above applies to the case when the UE is either trying to transfer a session from 3GPP to non-3GPP, or from non-3GPP to 3GPP Note that the actions set out above can be taken by the AMF when the AMF determines certain conditions such as, but not limited to, one of the default expected behaviours, as have been previously described. Alternatively, the AMF can take the actions above after making the following determinations or checks:

If any of the following conditions occur in any combination:

The UE is optionally using control plane CIoT 5GS optimization

There are existing N6 PDU sessions supporting interworking with EPS for this UE that were established with the Control plane only indication When the listed conditions are met, the AMF takes the actions that are set out above. Otherwise, based on AMF local policies, the AMF may allow the session to be transferred to the 3GPP access.

To reiterate, the action that should be taken by the AMF includes, but is not limited to, rejecting the request to transfer the session as has been described previously.

As indicated, the AMF behaviour can be based on different conditions that are verified by the AMF, based on the default behaviours that were described earlier. As such, depending on the CIoT 5GS optimization being used, the AMF should check for a particular condition that matches the default solution. When that condition occurs while processing an UL NAS TRANSPORT message with the Payload container type IE is set to "N1 SM information" and with the Request type IE is set to "existing PDU session", then the AMF sends the 5GSM message back to the UE as set out above.

For example, assume that the UE is using control plane CIoT 5GS optimization. Further assume that the UE may optionally have one of these sessions that is a control plane only session (i.e. the AMF had sent the Control Plane CIoT 5GS Optimisation indication or Control Plane Only indicator to the SMF), then when the UE requests the transfer of a session from 3GPP access to non-3GPP access (or from non-3GPP access to 3GPP access), then upon reception of the UL NAS TRANSPORT message with the Payload container type IE is set to "N1 SM information" and with the Request type IE is set to "existing PDU session", then the AMF verifies at least one condition, where the condition in this case is that the UE is using control plane CIoT 5SG optimization, and optionally having one PDU session that is control plane only session and, if the condition described above is met, then the AMF shall send the 5GSM message back to the UE as set out above (i.e. the AMF shall send the 5GSM message back to the UE using the DL NAS TRANSPORT message. The AMF shall include any existing 5GMM cause such as #92 "insufficient user-plane resources for the PDU session")

In another example, if the UE is in NB-IoT in the 3GPP access and already has UP resources that are established for a number of PDU sessions that equals the maximum number of DRBs that is supported by the UE, then when the UE sends a request to transfer a session from non-3GPP to 3GPP access, i.e. either:
  upon reception of the UL NAS TRANSPORT message (over the 3GPP access from a UE in NB-N1 mode) with the Payload container type IE is set to "N1 SM information" and with the Request type IE is set to "existing PDU session", the AMF shall send the 5GSM message back to the UE using the DL NAS TRANSPORT message. The AMF shall include any existing 5GMM cause such as #92"insufficient user-plane resources for the PDU session", or
  upon reception of a CPSR or SR message with the Allowed PDU session status, and possibly with the Uplink data status IE also included, the AMF shall not indicate to the SMF to re-establish the user-plane resources for the corresponding PDU sessions in the Allowed PDU session status IE, or both the Allowed PDU session status IE and the Uplink data status IE.

Note that for the case of NB-IoT, the description above considers that the maximum number of data radio bearers (DRBs) that a UE can support in NB-N1 mode is 2. However, this may not be the case and may actually be 1. Therefore, the number used above (i.e. 2), should be considered as an example only and not the only option. Hence, all of the above still apply if the maximum number of DRBs that an NB-IoT UE can support is either 1 or 2. As such, for all of the above, both the UE and AMF should verify the maximum number of DRBs that the UE supports in NB-N1 mode. This may be based on a capability indication that the UE sends to the network in any 5GMM NAS message. Hence, it can be assumed that the AMF knows the maximum number of DRBs that an NB-IoT UE can support. As such, when the AMF receives a request to transfer a session to the 3GPP access and the UE is in NB-N1 mode, the AMF should verify, as set out above, whether the UE already has UP resources that are established for a certain maximum number of PDU sessions, where this number is equal to the maximum number of DRBs that the UE can support that the AMF knows or has saved in the UE context. As such, for all of the above where it is assumed that 2 DRBs can be supported by the UE, and for all conditions that the AMF checks regarding the existence of UP resources for 2 PDU sessions, this number may, instead, be 1 and may be based on the maximum number of DRBs that the UE supports. Hence, all that is set out above still applies even if the number of DRBs supported by a UE in NB-N1 mode is 1. As such, for any condition set out above, where this condition could be that the UE or AMF checks for the existence of UP resources for 2 PDU sessions, the same conditions would apply for 1 PDU session when the UE supports a maximum of 1 DRB in NB-N1 mode.

In one embodiment, the AMF may ensure that at least one session that has been established over a first access type (e.g. 3GPP access) cannot be transferred over a second access type (e.g. non-3GPP access) when at least one CIoT 5GS optimization is being used (e.g. control plane CIoT 5GS optimization, or user plane CIoT 5GS optimization) by ensuring that the allowed Network Slice Selection Assistance Information (NSSAI) that is provided over each access type has mutually exclusive S-NSSAI entries i.e. the AMF provides an allowed NSSAI over each access type such that there is no S-NSSAI entry from the allowed NSSAI of one access type that also exists in the allowed NSSAI of a second access type. Note that the first access type may be 3GPP access type and the second (or other) access type may be non-3GPP access type, or vice versa. This solution will implicitly mean that the UE cannot request the transfer of a session as the prerequisite to do so requires that the S-NSSAI that is associated to the PDU session to be transferred must exist in the allowed NSSAI of the target access type over which the PDU session is desired to be transferred. The AMF may take this action when the UE is using specific CIoT optimizations, or when the UE enters a specific radio access technology over the 3GPP access. For example, the AMF may take the action set out above when the UE enters NB-N1 mode or is using NB-N1 mode. During the registration procedure that is initiated when the UE enters NB-N1 mode, the AMF updates the UE's allowed NSSAI in accordance with the procedure above and sends the allowed NSSAI in the Registration Accept message. Optionally, the AMF also sends the Configuration Update Command message to the UE over the non-3GPP access to update the allowed NSSAI as set out above.

Note that update of the allowed NSSAI may either mean that the allowed NSSAI for the 3GPP access is updated in accordance with the procedure above, or that the allowed NSSAI for the non-3GPP access is updated in accordance with the procedure above, or both allowed NSSAI for the 3GPP access and allowed NSSAI for the non-3GPP access are updated in accordance with the procedure above. The AMF may take the actions set out above based on local policies or based on specific subscription information optionally that were received from the UDM.

Note that for all the UE-based procedures set out above, the UE may be configured to operate as set out. This configuration may be a pre-configuration in the UE or may be a new configuration in the UE's USIM or other configuration files that may be stored in volatile or non-volatile memory. Alternatively, the network may inform the UE whether PDU sessions can be transferred across 3GPP and non-3GPP access, where this information can be very detailed e.g.:
  The indication can be for a transfer from a first access type to a second access type The indication can be when specific (one or more) CIoT 5GS optimization is being used The indication can be when specific conditions are met (as set out herein)

Any combination of the above

The indication from the network may be sent to the UE in any 5GMM NAS message such as, but not limited to, the Registration Accept message or the Configuration Update Command message, etc. A new IE can be defined for this purpose, if required. Note that the indication may also come from another entity in the core network and may be transported via the AMF using the DL NAS TRANSPORT message.

When the UE receives a 5GMM NAS message with an indication e.g. a new IE, containing information about whether PDU sessions can be transferred between a first access and a second access, the UE operates based on these indications.

Note that throughout this application, a first access may either be 3GPP access (including NB-IoT) or non-3GPP access. Similarly, a second access may either be 3GPP access (including NB-IoT) or non-3GPP access.

FIG. 2 illustrates a block diagram of an entity according to embodiments of the present disclosure.

Referring to the FIG. 2, the entity 200 may include a processor 210, a transceiver 220 and a memory 230. However, all of the illustrated components are not essential. The entity 200 may be implemented by more or less components than those illustrated in FIG. 2. In addition, the processor 210 and the transceiver 220 and the memory 230 may be implemented as a single chip according to another embodiment.

The aforementioned components will now be described in detail.

The processor 210 may include one or more processors or other processing devices that control the proposed function, process, and/or method. Operation of the entity 200 may be implemented by the processor 210.

In one embodiment, the processor 210 may map PRS to Resource Elements (REs) of a frame structure and transmit the frame structure such that the power used to transmit REs containing PRS is higher than the power used to transmit REs not containing PRS.

The transceiver 220 may include a RF transmitter for up-converting and amplifying a transmitted signal, and a RF receiver for down-converting a frequency of a received signal. However, according to another embodiment, the transceiver 220 may be implemented by more or less components than those illustrated in components.

The transceiver 200 may be connected to the processor 210 and transmit and/or receive a signal. The signal may include control information and data. In addition, the transceiver 220 may receive the signal through a wireless channel and output the signal to the processor 210. The transceiver 220 may transmit a signal output from the processor 210 through the wireless channel.

The memory 230 may store the control information or the data included in a signal obtained by the entity 200. The memory 230 may be connected to the processor 210 and store at least one instruction or a protocol or a parameter for the proposed function, process, and/or method. The memory 230 may include read-only memory (ROM) and/or random access memory (RAM) and/or hard disk and/or CD-ROM and/or DVD and/or other storage devices.

FIG. 3 illustrates a user equipment (UE) according to embodiments of the present disclosure.

Referring to the FIG. 3, the UE 300 may include a processor 310, a transceiver 320 and a memory 330. However, all of the illustrated components are not essential. The UE 300 may be implemented by more or less components than those illustrated in FIG. 3. In addition, the processor 310 and the transceiver 320 and the memory 330 may be implemented as a single chip according to another embodiment.

The aforementioned components will now be described in detail.

The processor 310 may include one or more processors or other processing devices that control the proposed function, process, and/or method. Operation of the UE 300 may be implemented by the processor 310.

In one embodiment, the processor 310 may measure the signal strength from one or more base stations and transmit PRS with a power determined based on the measurements.

In one embodiment, the processor 310 may receive signaling from a base station and transmit PRS with a power determined based on the signaling.

The transceiver 320 may include a RF transmitter for up-converting and amplifying a transmitted signal, and a RF receiver for down-converting a frequency of a received signal. However, according to another embodiment, the transceiver 320 may be implemented by more or less components than those illustrated in components.

The transceiver 320 may be connected to the processor 310 and transmit and/or receive a signal. The signal may include control information and data. In addition, the transceiver 320 may receive the signal through a wireless channel and output the signal to the processor 310. The transceiver 320 may transmit a signal output from the processor 310 through the wireless channel.

The memory 330 may store the control information or the data included in a signal obtained by the UE 300. The memory 330 may be connected to the processor 310 and store at least one instruction or a protocol or a parameter for the proposed function, process, and/or method. The memory 330 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

It will be understood by the skilled person that the procedures set out above apply in any combination or any order. Some or all of the conditions (which may be in the form of default behaviour as set out) may be enforced/applied/verified at the UE or at the network, as required.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by an access and mobility management function (AMF) in a wireless communication system, the method comprising:
    receiving, from a user equipment (UE), a UL NAS TRANSPORT message including a $5^{th}$ generation session management (5GSM) message to transfer a protocol data unit (PDU) session between a $3^{rd}$ generation partnership project (3GPP) access and a non-3GPP access; and
    in case that a Payload container type information element (IE) of the UL NAS TRANSPORT message is set to N1 SM information and a Request type IE is set to existing PDU session, sending back the 5GSM message, which is not forwarded to a session management function (SMF), to the UE using a DL NAS TRANSPORT message.

2. The method of claim 1,
    wherein the UL NAS TRANSPORT message indicates the PDU session is associated with control plane only indication.

3. The method of claim 1,
wherein the UE is in a NB-N1 mode,
wherein a number of PDU sessions having user plane resources established for the UE equals to a maximum number of supported user plane resources for the UE, and
wherein the UE indicated preference for user plane CIoT optimization and the AMF accepted a use of the user plane CIoT optimization.

4. The method of claim 1, further comprising:
receiving, from the UE, information on cellular internet of things (CIoT) optimization.

5. The method of claim 1, wherein the DL NAS transport message further includes a cause value.

6. An access and mobility management function (AMF) in a wireless communication system, the AMF comprising:
a transceiver; and
a controller configured to:
receive, from a user equipment (UE), a UL NAS TRANSPORT message including a $5^{th}$ generation session management (5GSM) message to transfer a protocol data unit (PDU) session between a 3GPP access and a non-3GPP access, and
in case that a Payload container type IE of the UL NAS Transport message is set to N1 SM information and a Request type IE is set to existing PDU session, send back the 5GSM message, which is not forwarded to a sessions management function (SMF), to the UE using a DL NAS TRANSPORT message.

7. The AMF of claim 6, wherein the UL NAS TRANSPORT message indicates the PDU session is associated with control plane only indication.

8. The AMF of claim 6,
wherein the UE is in a NB-N1 mode,
wherein a number of PDU sessions having user plane resources established for the UE equals to a maximum number of supported user plane resources for the UE, and
wherein the UE indicated preference for user plane CIoT optimization and the AMF accepted a use of the user plane CIoT optimization.

9. The AMF of claim 6, wherein the controller is further configured to:
receive, from the UE, information on cellular internet of things (CIoT) optimization.

10. The AMF of claim 6, wherein the DL NAS transport message further includes a cause value.

\* \* \* \* \*